United States Patent [19]

Fukai et al.

[11] Patent Number: 4,754,143
[45] Date of Patent: Jun. 28, 1988

[54] SCANNING READ-OUT APPARATUS WITH SCANNING SPEED FLUCTUATION COMPENSATING MEANS AND CORRECTION COEFFICIENT ADJUSTING METHOD

[75] Inventors: Nobutaka Fukai; Toshitaka Agano, both of Kanagawa, Japan

[73] Assignee: Fuji Photo Film Co., Ltd., Kanagawa, Japan

[21] Appl. No.: 16,481

[22] Filed: Feb. 17, 1987

Related U.S. Application Data

[63] Continuation of Ser. No. 774,765, Sep. 10, 1985.

[30] Foreign Application Priority Data

Sep. 12, 1984 [JP] Japan .................................. 59-191325
Oct. 4, 1984 [JP] Japan .................................. 59-208830

[51] Int. Cl.⁴ .......................................... G01T 1/105
[52] U.S. Cl. .............................. 250/484.1; 250/327.2; 358/285
[58] Field of Search ..................... 250/327.2, 484.1; 358/280, 285, 288

[56] References Cited

U.S. PATENT DOCUMENTS

| | | | |
|---|---|---|---|
| Re. 30911 | 4/1982 | Burnett ................................. | 358/75 |
| 4,032,888 | 6/1977 | Broyles et al. ..................... | 382/66 |
| 4,258,254 | 3/1981 | Kotera et al. ...................... | 250/484.1 |
| 4,346,295 | 8/1982 | Tanaka et al. .................... | 250/327.2 |
| 4,523,093 | 6/1985 | Neumann ............................ | 250/234 |
| 4,551,626 | 11/1985 | Agano ................................. | 250/327.2 |
| 4,591,727 | 5/1986 | Gaebelein et al. ................. | 250/578 |

Primary Examiner—Janice A. Howell
Assistant Examiner—Constantine Hannaher
Attorney, Agent, or Firm—Sughrue, Mion, Zinn, Macpeak & Seas

[57] ABSTRACT

A scanning read-out apparatus comprises a device for detecting the scanning speed of a light beam and generating a scanning speed signal, and a device for calculation between a read-out signal detected by scanning of a read-out objective and the scanning speed signal and for generating a corrected read-out signal representing the result of the calculation. A coefficient for correction of the read-out signal is adjusted by forcibly fluctuating the scanning speed of the light beam on a read-out objective for correction coefficient adjustment, generating a correction signal by multiplying the scanning speed signal by an arbitrary coefficient, correcting the read-out signal by using the correction signal, extracting a signal of a noise component caused by the forcible fluctuation from the corrected read-out signal, finding the coefficient at which the extracted signal becomes the minimum, and using the coefficient thus found as the correction coefficient.

6 Claims, 2 Drawing Sheets

SCANNING READ-OUT APPARATUS WITH SCANNING SPEED FLUCTUATION COMPENSATING MEANS AND CORRECTION COEFFICIENT ADJUSTING METHOD

This is a continuation of application Ser. No 774,765, filed Sept. 10, 1985.

BACKGROUND OF THE INVENTION

1. Field of the Invention

This invention relates to a scanning read-out apparatus for scanning a read-out objective with a light beam by use of a light scanning means such as a galvanometer mirror, detecting the information recorded on the read-out objective, and generating a read-out signal, which is provided with a means for correcting the read-out signal with respect to a fluctuation in scanning speed in order to eliminate adverse effects of the fluctuation in scanning speed from the read-out signal. This invention also relates to a method of adjusting a correction coefficient used for eliminating the noise component caused by the fluctuation in scanning speed.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

FIG. 4 is a perspective view showing the conventional read-out apparatus used in the aforesaid radiation image recording and reproducing system for scanning a stimulable phosphor sheet carrying a radiation image stored therein by stimulating rays such as a laser beam which cause the sheet to emit light in proportion to the stored radiation energy, and photoelectrically detecting the emitted light.

In the apparatus of FIG. 4, stimulating rays 2 are emitted by a stimulating ray source 1, and the beam diameter of the stimulating rays 2 is precisely adjusted by a beam expander 3. The stimulating rays 2 are then deflected by a scanning means 4 formed of a galvanometer mirror or the like, and are made to impinge upon the stimulable phosphor sheet 10 by a plane reflection mirror 5. Between the scanning means 4 and the plane reflection mirror 5 is positioned an fθ lens 6 for maintaining the beam diameter of the stimulating rays 2 uniform during the equal-speed scanning of the stimulating rays 2 on the stimulable phosphor sheet 10. While the stimulating rays 2 impinge upon the stimulable phosphor sheet 10, the sheet 10 is moved in the direction as indicated by the arrow A (i.e. sub-scanning direction ) and, consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light entering the light guide member 8 is transmitted through total reflection inside of the light guide member 8, and received by a photodetector 9 such as a photomultiplier. The light guide member 8 and the photodetector 9 constitute a photoelectric read-out means 7. The light detected by the photodetector 9 is converted into an electric image signal, which is passed through an amplifier 11, an A/D converter 12 and a signal processing circuit 13, and then used to reproduce a visible image on a recording material such as a photographic film or a display device such as a CRT. The light guide member 8 may be of a shape and a material as disclosed in U.S. Pat. No. 4,346,295.

However, in the apparatus of the type scanning a light beam by use of scanning means such as a galvanometer mirror, the scanning speed of the light beam along a scanning line 14 is often caused to fluctuate by a fluctuation in movement speed of the scanning means, for example, by a fluctuation in the swinging speed of the galvanometer mirror. When the scanning speed fluctuates, the read-out image signal obtained by the scanning contains adverse effects of the fluctuation in scanning speed, and it becomes not always possible to conduct the scanning read-out with high accuracy.

One approach to elimination of the problem caused by the fluctuation in scanning speed is to eliminate the scanning speed fluctuation components of the scanning means by controlling the movement speed of the scanning means which causes the fluctuation.

In this method, of the scanning speed fluctuation components, the low-frequency component can be eliminated by controlling the scanning means. However, it is not always possible to eliminate the high-frequency component by controlling the scanning means.

SUMMARY OF THE INVENTION

The primary object of the present invention is to provide a scanning read-out apparatus provided with a means for compensation for a fluctuation in scanning speed, wherein adverse effects of scanning speed fluctuation components over a wide frequency range including the high-frequency component are eliminated by correcting the read-out signal with respect to the fluctuation in scanning speed.

Another object of the present invention is to provide a method of efficiently adjusting the correction coefficient used for the correction of the read-out signal with respect to the fluctuation in scanning speed.

The present invention provides a scanning read-out apparatus provided with a means for compensation for a fluctuation in scanning speed, which comprises:
(i) a light source for emitting a light beam for scanning,
(ii) a scanning means for scanning said light beam on a read-out objective carrying information recorded thereon,
(iii) a read-out means for detecting the information recorded on said read-out objective and released therefrom during the scanning by said light beam, and generating a signal representing the read-out information, (iv) a speed detection means for detecting the scanning speed of said light beam emitted by said scanning means, and generating a signal representing the scanning speed, and (v) a calculation means for performing a calculation involving said signal representing the read-out information and said signal representing the scanning speed, and generating a corrected read-out signal representing the result of the calculation.

The present invention also provides, in a method of compensation for a fluctuation in scanning speed wherein a scanning speed of a light beam scanned on a read-out objective by a scanning means is detected to obtain a signal representing the scanning speed, the speed signal is multiplied by a predetermined correction coefficient to generate a correction signal, and a calculation is conducted between the correction signal and a read-out signal obtained by scanning the read-out objective by said light beam, thereby eliminating a noise component caused in said read-out signal by a fluctuation in scanning speed of said light beam, a method of adjusting the correction coefficient which comprises the steps of:

(i) scanning a read-out objective for correction coefficient adjustment by a light beam the scanning speed of which is fluctuated forcibly by entering a signal for generating a fluctuation in scanning speed to said scanning means, (ii) detecting the scanning speed of the light beam during the scanning to obtain a signal representing said scanning speed, (iii) generating a correction signal by multiplying said signal by an arbitrary coefficient, (iv) generating a corrected read-out signal by calculating between said correction signal and a read-out signal obtained by scanning said read-out objective for correction coefficient adjustment by said light beam, (v) extracting a signal portion only of a noise component caused by said forcibly generated fluctuation in scanning speed of said light beam from said corrected read-out signal, (vi) finding the value of said coefficient at which the value of said signal becomes the minimum by a feedback process wherein the value of said coefficient is changed in accordance with the value of said extracted signal, and (vii) using the value of said coefficient thus found as said predetermined correction coefficient.

The scanning read-out apparatus of the present invention is provided with the speed detection means for detecting the scanning speed of a light beam, and the calculation means for performing a calculation in accordance with a speed signal generated by the speed detection means and a read-out signal so that, for example, multiplication, is carried out between the speed signal and the read-out signal is conducted to eliminate components caused in the read-out signal by a fluctuation in scanning speed. Therefore, it is possible to eliminate adverse effects of the fluctuation in scanning speed of the light beam, i.e. fluctuation components caused in the read-out signal by a fluctuation in movement speed of the scanning means such as a galvanometer mirror. Also, since the elimination is effected by detecting the scanning speed and calculating between the speed signal and the read-out signal, it is possible to correct the read-out signal with respect to the fluctuation in scanning speed over a wide frequency range including not only the low-frequency component but also the high-frequency component. Further, when the calculation comprises logarithmic conversion and addition as described later, it becomes possible to achieve the correction at higher accuracy. The scanning read-out apparatus of the present invention is particularly suitable for the case where high scanning stability is required, for example, for read-out of a medium contrast image as in the case where a stimulable phosphor sheet is used.

In the method of adjusting the correction coefficient in accordance with the present invention, a sample (the read-out objective for correction coefficient adjustment) is used, the degree of correction is investigated by changing the coefficient while the read-out operation is conducted by use of a light beam the scanning speed of which is fluctuated forcibly, and the value of the coefficient at which optimum correction is obtained is used as the value of the correction coefficient. Therefore, it is possible to adjust the correction coefficient always to the optimum value. Particularly, since large noise components are made to arise in the read-out signal by the forcible fluctuation in scanning speed of the light beam, it is possible to grasp a decrease in the noise components quickly and accurately, and therefore to efficiently adjust the correction coefficient to the optimum value.

DESCRIPTION OF THE PREFERRED EMBODIMENTS

The present invention will hereinbelow be described in further detail with reference to the accompanying drawings.

Figure 1:
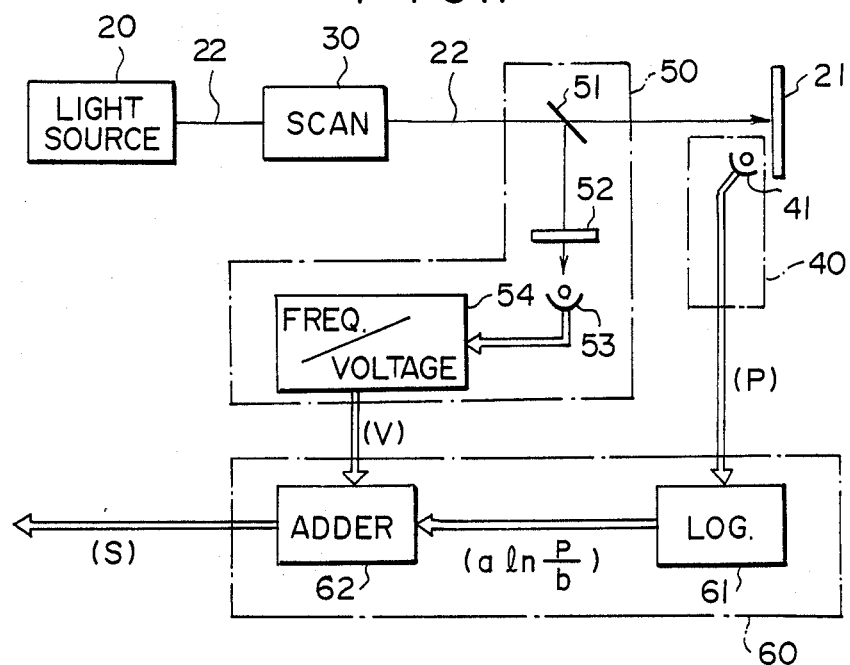
FIG. 1 is a block diagram showing an embodiment of the scanning read-out apparatus in accordance with the present invention.

FIG. 1 shows an embodiment of the scanning read-out apparatus in accordance with the present invention, which is constituted for scanning read-out of information recorded on a stimulable phosphor sheet in the aforesaid radiation image recording and reproducing system.

The scanning read-out apparatus comprises a light source 20, a scanning means 30, a read-out means 40, a speed detection means 50 and a signal calculation means 60.

The light source 20 emits a light beam 22, for example, a laser beam for scanning a stimulable phosphor sheet 21 as the read-out objective.

The scanning means 30 scans the light beam 22 on the read-out objective 21. Though a galvanometer mirror is used as the scanning means 30 in this embodiment, it is also possible to use a light deflector such as a rotating polygon mirror or a hologram.

The read-out means 40 detects the information released by the read-out objective 21 when it is scanned by the light beam 22, i.e. the information recorded on the read-out objective 21, and generates a signal P representing the detected information. In this embodiment, the read-out means 40 is constituted by a photodetector 41, for example, a photomultiplier. Specifically, when the stimulable phosphor sheet 21 is scanned by the laser beam 22, the image information recorded on the stimulable phosphor sheet 21 is released as light emission. The emitted light is detected by the photodetector 41, which generates an electric signal of a level proportional to the amount of the emitted light. The signal P representing the read-out information and generated by the read-out means 40 may be the signal directly generated by the photodetector 41 or a signal obtained by a processing such as amplification or A/D conversion of the signal generated by the photodetector 41.

The speed detection means 50 detects the scanning speed of the light beam 22 emitted from the scanning means 30 to the read-out objective 21, and generates a signal V representing the scanning speed. In this embodiment, the speed detection means 50 comprises a semi-transparent mirror 51 for reflecting a part of the light beam 22 emitted from the scanning means 30, a grid 52 through which the light reflected by the semi-transparent mirror 51 passes, a photodetector 53 for detecting the light pulses passing through the grid 52 and generating electric pulses, and a frequency-voltage converter 54 for generating a signal V representing the scanning speed from the signal generated by the photodetector 53. The scanning direction of the light beam 22 is normal to the drawing sheet in FIG. 1. The signal V representing the scanning speed and generated by the speed detection means 50 may be the signal directly generated by the frequency-voltage converter 54 or a signal obtained by processing the signal generated by the converter 54.

The calculation means 60 calculates between the signals P and V respectively generated by the read-out means 40 and the speed detection means 50, and outputs the calculation result as a corrected read-out signal S. Basically, in the calculation, the read-out signal P generated by the read-out means 40 is multiplied by the speed signal V generated by the speed detection means 50. Therefore, the calculation means 50 may be constituted by a multiplier (not shown) for multiplying the signal P by the signal V. However, in this embodiment, in order to achieve the multiplication by logarithmic conversion and addition, the calculation means 50 is constituted by a logarithmic converter 61 for logarithmically converting the read-out signal P generated by the read-out means 40, and an adder 62 for adding the signal generated by the logarithmic converter 61 to the speed signal V generated by the speed detection means 50. Strictly speaking, the speed signal V should be logarithmically converted and fed to the adder 62, and the calculation means 60 may be constructed in such a manner. However, actually, the fluctuation ($\Delta V$) in scanning speed is very small, and there holds the formula $$\ln(Vo + \Delta V) \approx \ln Vo + \frac{\Delta V}{Vo}$$

where Vo denotes the predetermined scanning speed and lnVo is a known constant. Therefore, the value of the formula $$\ln Vo \text{ (constant)} + \frac{\Delta V}{Vo}$$

is fed to the adder 62 without logarithmically converting the speed signal V. In the adder 62, addition may be conducted after weighting the input signals by multiplying them by predetermined coefficients. Weighting may also be effected in the aforesaid multiplier.

Figure 2:
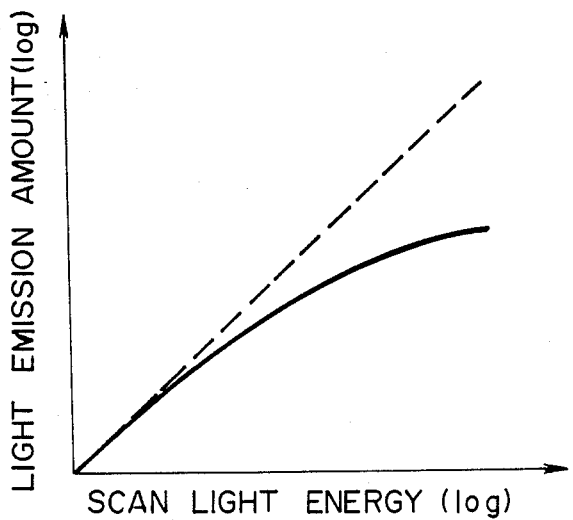
FIG. 2 is a graph showing the relationship between the scanning light energy and the amount of light emitted by a stimulable phosphor sheet upon stimulation thereof in a radiation image recording and reproducing system.

Specifically, the calculation may be conducted as described below. In one calculation method, the speed signal V is added to a signal aln(p/b) where a and b are the constants fixed by the logarithmic converter used, which is generated by the logarithmic converter 61, in the adder 62, and the result of the addition is output as the corrected read-out signal S. In this case, the addition should preferably be conducted after multiplying the speed signal V and the signal aln(p/b) respectively by correction coefficients $\alpha$ and $\beta$. This is because the relationship between the scanning light energy (inversely proportional to the scanning speed) and the amount of light emitted by the stimulable phosphor sheet when it is scanned by stimulating rays is not linear but is nonlinear as indicated by the solid line in FIG. 2, and therefore the read-out signal cannot be accurately corrected by mere addition.

Accordingly, the calculation executed in this embodiment is represented by the formula $$S = \alpha V + \beta \left( a \ln \frac{P}{b} \right) \tag{0}$$
$$= \alpha\beta \ln P + \alpha V + \alpha\beta \ln \frac{1}{b}$$

The correction coefficients $\alpha$ and $\beta$ are adjusted as described below.

When P changes to $Po + \Delta P$ as a result of a change of V from Vo to $Vo + \Delta V$, the following condition must be satisfied in order to maintain the corrected read-out signal S unchanged.

$$\begin{aligned} 0 &= S|V = Vo + \Delta V - S|V = Vo \\ &= \alpha\beta[\ln(Po + \Delta P) - \ln Po] + \alpha\Delta V \\ &= \alpha\beta\ln\left(1 + \frac{\Delta P}{Po}\right) + \alpha\Delta V \\ &\approx \alpha\beta \cdot \frac{\Delta P}{Po} + \alpha\Delta V \end{aligned} \tag{1}$$

where
$1 >> (\Delta P/Po)$.

In general, the relationship between V and P is expressed by the formula $$P = kV^l$$

In this case, the relationship between $\Delta P$ and $\Delta V$ is expressed by the formula $$\Delta P = Po + \Delta P - Po$$
$$= k(Vo + \Delta V)^l - kVo^l$$
$$= kVo^l\left(1 + \frac{\Delta V}{Vo}\right)^l - kVo^l$$
$$\approx kVo^l \cdot l\frac{\Delta V}{Vo} \quad \left(\text{where } 1 >> \frac{\Delta V}{Vo}\right)$$
$$= Po \cdot l\frac{\Delta V}{Vo}$$

Substitution of this formula into Formula (1) gives $$a\beta l\frac{\Delta V}{Vo} + a\Delta V = 0 \qquad (2)$$

$$\therefore a = -\frac{a\beta l}{Vo}$$

That is, when calculation of Formula (0) is conducted by selecting the coefficient $\beta$ arbitrarily and adjusting the coefficient $\alpha$ in accordance with Formula (2), it is possible to eliminate the effects of the change in the speed signal V on the read-out signal P.

The scanning speed Vo and the constant l may be selected in accordance with the scanning conditions such as the scanning line density selected in accordance with the size of the stimulable phosphor sheet, the power of the scanning light source, and the type of the stimulable phosphor sheet.

In another calculation method, only the error component $\Delta V$ of the speed signal V is calculated in advance by subtracting Vo from $V=Vo+\Delta V$ generated by the frequency-voltage converter 54, and is multiplied by the coefficient $\alpha$. The value thus obtained is added to the output signal aln(p/b) from the logarithmic converter 61 multiplied by the coefficient $\beta$. In the first calculation method mentioned, the value of the corrected read-out signal S changes by $\alpha$Vo in accordance with the compensation for the fluctuation in scanning speed. Change in the corrected read-out signal S is avoided when $\Delta V$ is calculated in advance and then addition is conducted as in the second calculation method mentioned.

In a further calculation method, only a predetermined frequency component of the speed signal is taken up by use of a filter and is multiplied by the coefficient $\alpha$. The value thus obtained is added to the output signal aln(p/b) from the logarithmic converter 61 multiplied by the coefficient $\beta$. In this method, by removing unnecessary frequency components, it is possible to eliminate noise.

Figure 3:
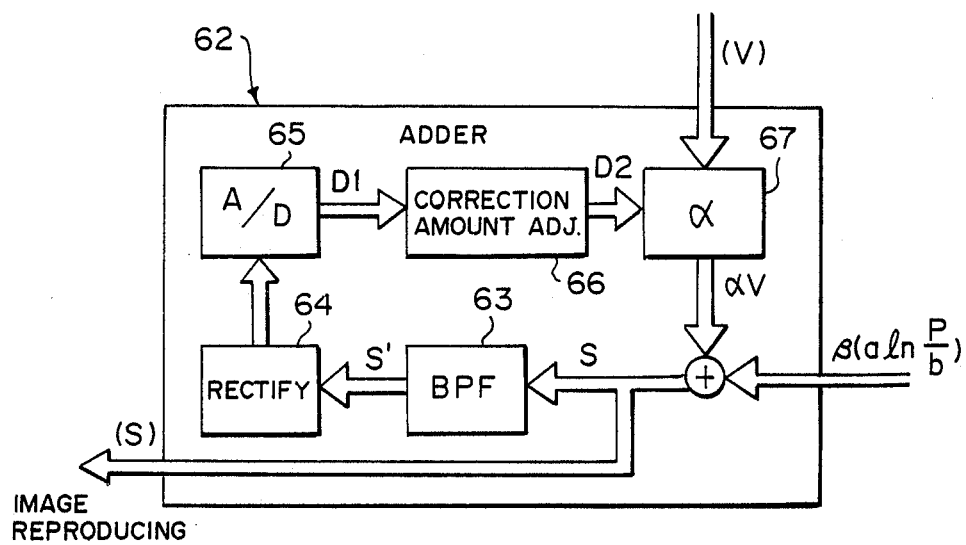
FIG. 3 is a block diagram showing an example of the details of the adder used in an embodiment of the correction coefficient adjusting method in accordance with the present invention.
Figure 4:
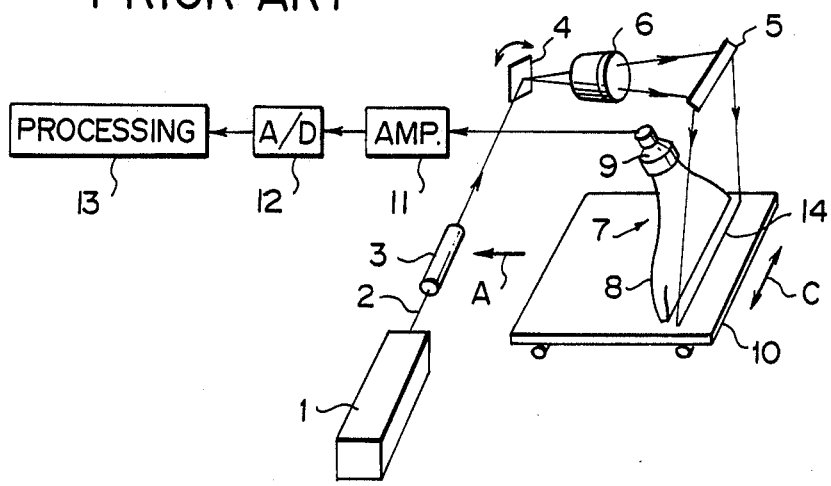
FIG. 4 is a perspective view showing an example of the conventional scanning read-out apparatus.

FIG. 3 illustrates a modification of the adder 62 as shown in FIG. 1 in which the coefficient $\alpha$ is determined by use of a feedback control. The adder 62 receives a scanning speed signal V from the frequency-voltage converter 54 as shown in FIG. 1 and another signal aln(p/b) from the logarithmic converter 61 as also shown in FIG. 1. The signal aln(p/b) is multiplied by a correction coefficient $\beta$ before it is added to the signal V multiplied by $\alpha$.

In order to generate a correction signal $\alpha$V by multiplying the scanning speed signal V by a predetermined correction coefficient $\alpha$, the scanning speed signal V is amplified by a variable amplifier 67 at an amplification degree $\alpha$, and the correction signal $\alpha$V is generated. Also, in order to generate a corrected read-out signal S by calculating between the read-out signal aln(p/b) and the correction signal $\alpha$V, the correction signal $\alpha$V is added to the read-out signal aln(p/b), and the corrected read-out signal S is obtained.

An embodiment of the method of adjusting the value of the correction coefficient $\alpha$ in the aforesaid method of compensation for scanning speed fluctuation will be described below with reference to FIG. 3 as well as FIG. 1.

In this embodiment, the correction coefficient $\alpha$ in the case of a combination of an arbitrary stimulable phosphor sheet with an arbitrary level of laser beam energy is adjusted.

Similarly to the embodiment as shown in FIG. 1, the stimulable phosphor sheet 21 for correction coefficient adjustment is scanned by the laser beam 22 the scanning speed of which is fluctuated forcibly. In this embodiment a high frequency noise is input into the driving signal of the galvanometer. A corrected read-out signal S is obtained by calculating a read-out signal P thus obtained in the same manner as described with respect to the aforesaid method for compensation for the fluctuation in scanning speed. For example, a signal P generated by the photodetector 41 is logarithmically converted to obtain aln(p/b). On the other hand, a signal generated by the frequency-voltage converter 54 from the synchronous light emitted from the galvanometer mirror 30 the swinging speed of which is fluctuated, and passing through the grid 52, the photodetector 53 and the converter 54 is used as a signal V representing the scanning speed. The signal V is multiplied by an arbitrary coefficient $\alpha$(e.g. $\alpha=0$) to generate a correction signal $\alpha$V, and the signal aln(p/b) and $\alpha$V are added to each other to generate a corrected read-out signal S.

Then, a signal portion S' representing the noise components caused by the fluctuation in scanning speed which is forcibly generated is extracted from the corrected read-out signal S. The signal portion S' representing the noise components caused by the fluctuation in scanning speed includes not only the noise components caused by the fluctuation in scanning speed but also a component representing the information recorded on the stimulable phosphor sheet 21. However, the latter component representing the recorded information exhibits little change, i.e. the fluctuation of the latter component is very much smaller than the fluctuation of the noise components. Therefore, a signal portion is also included to an extent that inclusion of the noise components in the extracted signal is detectable on the basis of the characteristic values of the signal.

For example, when a stimulable phosphor sheet uniformly exposed to a radiation over the whole sheet surface is used as the stimulable phosphor sheet for correction coefficient adjustment, the signal representing the information recorded on the stimulable phosphor sheet is uniform, and therefore any part of the read-out signal S may be handled as the signal representing only the noise components caused by the fluctuation in scanning speed.

In this embodiment, a stimulable phosphor sheet uniformly exposed to a radiation over the whole sheet surface is used as the stimulable phosphor sheet for correction coefficient adjustment. Therefore, when only the frequency band of the noise signal fed to the galvanometer mirror 30 is extracted from the corrected read-out signal S, the extracted signal S' represents the signal portion of only the noise components caused by the forcible fluctuation in scanning speed. Accordingly, a band-pass filter 63 is used for transmitting only the frequency band of the noise signal fed to the galvanometer mirror 30. After the signal S' substantially containing only the noise components is extracted in this manner, a value of the coefficient at which the characteristic value of the signal S' becomes the minimum is found by the feedback process wherein the coefficient is changed sequentially in accordance with the characteristic value representing the level of the noise components of the signal S', for example, the root-mean-square value of the signal S'. The value of the coefficient thus found is adjusted and stored as the value of the correction coefficient $\alpha$, and is used later for the combination of the same stimulable phosphor sheet with the same level of laser beam energy.

In this embodiment, the extracted signal S' is rectified by a rectifier 64 and is converted by an A/D converter 65 into a digital signal D1. A digital signal D2 is generated by a correction amount adjusting means 66 in order to change the coefficient $\alpha$ so that the digital signal D1 is minimized. The digital signal D2 is converted into an analog signal, and the arbitrary value of the coefficient $\alpha$ selected originally (e.g. $\alpha=0$) is changed. The same control is conducted by use of the new value of the coefficient $\alpha$. This feedback operation is repeated to find the coefficient $\alpha$ at which the digital signal D1 becomes the minimum, and the value of the coefficient $\alpha$ thus found is employed and stored as the predetermined value of the correction coefficient $\alpha$.

The corrected read-out signal S may also be calculated in any other manner as described below.

In a first method, the logarithmic converter 61 in FIG. 1 is not used, and the signal P generated by the photodetector 40 is directly used as the read-out signal. The signal P is added to the correction signal $\alpha V$ to calculate the corrected read-out signal S as $S = P + \alpha V$.

In a second method, calculation is conducted by adding a logarithmic converter (not shown) to the configuration of FIG. 1 for logarithmically converting the output signal V of the frequency-voltage converter 54. In this case, the speed signal V becomes $V = \log V$, and therefore the corrected read-out signal S is calculated by $S = a \ln(p/b) + \alpha \log V$.

In a third method, the logarithmic converter 61 in FIG. 1 is not used and, instead of addition, multiplication is conducted between the signal P and the signal V. In this case, the corrected read-out signal S is calculated by $S = \alpha PV$.

When the fluctuation in scanning speed is within the range of $\pm 1\%$ to 2%, the above-described formulas for calculating the corrected read-out signal S become approximately identical with each other, and therefore nearly the same S value can be obtained in all of the aforesaid cases.

We claim:

1. A scanning read-out apparatus provided with a means for compensating for fluctuation in scanning speed, said apparatus comprising:
   (i) a light source for emitting a light beam for scanning,
   (ii) scanning means for scanning said light beam on a read-out objective carrying information recorded thereon,
   (iii) fluctuation means, connected to said scanning means, for forcibly generating fluctuation in scanning speed of said scanning means,
   (iv) read-out means for detecting the information recorded on said read-out objective and released therefrom during the scanning by said light beam, and generating a signal representing the read-out information,
   (v) speed detection means for detecting the scanning speed of said light beam emitted by said scanning means, and generating a signal representing the scanning speed.
   (vi) calculation means for performing a calculation wherein said signal representing the read-out information is a first input and said signal representing the scanning speed is a second input, said second input being multiplied by an arbitrary coefficient to provide a third input, said calculation means generating a corrected read-out signal representing the result of the calculation in accordance with both of said first and third inputs,
   (vii) means for extracting a signal portion only of a noise component caused by said forcibly generated fluctuation in scanning speed of said scanning means, from said corrected read-out signal, and
   (viii) feedback means for feeding back said extracted signal portion so as to determine a correction coefficient which minimizes a value of said extracted signal portion,
       wherein said correction coefficient is changed in a feedback manner in accordance with a valve of said extracted signal portion to obtain a predetermined correction coefficient so as to eliminate a noise component caused in said read-out signal by scanning speed fluctuation.

2. An apparatus as defined in claim 1 wherein said calculation means is provided with a multiplier for multiplying said signal representing the read-out information by said signal representing the scanning speed.

3. An apparatus as defined in claim 1 wherein said calculation means is provided with a logarithmic conversion means for logarithmically converting said signal representing the read-out information, and an adder for adding a signal generated by said logarithmic conversion means to said signal representing the scanning speed.

4. An apparatus as defined in claim 1, 2 or 3 wherein said speed detection means comprises a grid and a photodetector positioned at the rear of said grid.

5. An apparatus as defined in claim 1, 2 or 3 wherein said read-out objective is a stimulable phosphor sheet carrying a radiation image stored thereon.

6. In a method of compensation for a fluctuation in scanning speed wherein a scanning speed of a light beam scanned on a read-out objective by a scanning means is detected to obtain a signal representing the scanning speed, the speed signal is multiplied by a predetermined correction coefficient to generate a correction signal, and a calculation is conducted between the correction signal and a read-out signal obtained by scanning the read-out objective by said light beam, so as to eliminate a noise component caused in said read-out signal by a fluctuation in scanning speed of said light beam,
    a method of adjusting the correction coefficient which comprises the steps of:
    (i) scanning a read-out objective for correction coefficient adjustment by a light beam the scanning speed of which is fluctuated forcibly by entering a signal for generating a fluctuation in scanning speed to said scanning means, (ii) detecting the scanning speed of the light beam during the scanning to obtain a signal representing said scanning speed, (iii) generating a correction signal by multiplying said signal by an arbitrary coefficient, (iv) generating a corrected read-out signal by calculating between said correction signal and a read-out signal obtained by scanning said read-out objective for correction coefficient adjustment by said light beam, (v) extracting a signal portion only of a noise component caused by said forcibly generated fluctuation in scanning speed of said light beam from said corrected read-out signal, (vi) finding the value of said coefficient at which the value of said signal becomes the minimum by a feedback process wherein the value of said coefficient is changed in accordance with the value of said extracted signal, and (vii) using the value of said coefficient thus found as said predetermined correction coefficient.

* * * * *